(12) United States Patent
Dietz

(10) Patent No.: US 7,751,964 B2
(45) Date of Patent: Jul. 6, 2010

(54) CONTROL UNIT FOR CONTROLLING AN AUTOMATIC SHUT-OFF AND/OR START-UP PROCESS OF A VEHICLE POWER PLANT

(75) Inventor: Volker Dietz, Hoechstadt (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/534,480

(22) Filed: Aug. 3, 2009

(65) Prior Publication Data
US 2009/0292453 A1   Nov. 26, 2009

Related U.S. Application Data

(63) Continuation of application No. PCT/EP2008/001410, filed on Feb. 22, 2008.

(30) Foreign Application Priority Data
Feb. 28, 2007   (DE) ............ 10 2007 009 836

(51) Int. Cl.
*G06F 19/00* (2006.01)
*F02D 45/00* (2006.01)
(52) U.S. Cl. ............... 701/112; 123/179.4
(58) Field of Classification Search ............... 701/112, 701/113, 29, 35; 123/179.4, 179.5, 179.15, 123/179.16
See application file for complete search history.

(56) References Cited

U.S. PATENT DOCUMENTS

| | | | | |
|---|---|---|---|---|
| 4,224,913 A | * | 9/1980 | Barnard | 123/179.16 |
| 4,856,475 A | * | 8/1989 | Shimomura et al. | 123/339.21 |
| 5,311,430 A | * | 5/1994 | Ishigami | 701/35 |
| 6,526,931 B1 | * | 3/2003 | Vilou | 123/179.4 |
| 7,523,743 B1 | * | 4/2009 | Geveci et al. | 123/486 |
| 2002/0074173 A1 | | 6/2002 | Morimoto et al. | |
| 2005/0014605 A1 | | 1/2005 | Ries-Mueller | |

FOREIGN PATENT DOCUMENTS

| | | |
|---|---|---|
| DE | 44 12 438 C1 | 11/1995 |
| DE | 100 15 319 A1 | 11/2000 |

(Continued)

OTHER PUBLICATIONS

International Search Report dated Jun. 9, 2008 with English translation (four (4) pages).
German Search Report dated Oct. 12, 2007 with English translation (nine (9) pages).

*Primary Examiner*—Hieu T Vo
(74) *Attorney, Agent, or Firm*—Crowell & Moring LLP

(57) ABSTRACT

A control unit and method are provided for controlling an automatic shut-off process of a vehicle power plant in a motor vehicle, wherein the control unit emits a shut-off signal for initiating corresponding shut-off measures for automatically shutting off the vehicle power plant, when predetermined shut-off request conditions are fulfilled, and no predetermined shut-off inhibiting condition is fulfilled. The control unit sends to a memory unit a memory signal for storing at least one memory entry, allocated to a shut-off inhibiting condition, when predetermined conditions are fulfilled. In an analogous manner, a control unit and method are designed for controlling an automatic start-up process.

18 Claims, 2 Drawing Sheets

FOREIGN PATENT DOCUMENTS

| | | |
|---|---|---|
| DE | 100 30 290 A1 | 8/2001 |
| DE | 101 61 343 A1 | 7/2002 |
| DE | 102 11 461 C1 | 7/2003 |
| DE | 102 11 462 C1 | 7/2003 |
| DE | 103 07 462 A1 | 9/2004 |
| DE | 10 2004 044 473 A1 | 3/2006 |

* cited by examiner

|     | S | S_A | E_A | Z  |
|-----|---|-----|-----|----|
| AV1 | 1 | 700 | 650 | 15 |
| AV2 | 0 | 20  | 25  | 1  |
| AV3 | 0 | 0   | 0   | 0  |

— Sp

CONTROL UNIT FOR CONTROLLING AN AUTOMATIC SHUT-OFF AND/OR START-UP PROCESS OF A VEHICLE POWER PLANT

CROSS-REFERENCE TO RELATED APPLICATIONS

This application is a continuation of PCT International Application No. PCT/EP2008/001410, filed Feb. 22, 2008, which claims priority under 35 U.S.C. §119 to German Patent Application No. DE 10 2007 009 836.9, filed Feb. 28, 2007, the entire disclosures of which are herein expressly incorporated by reference.

BACKGROUND AND SUMMARY OF THE INVENTION

The invention relates to a control unit for controlling an automatic shut-off process of an internal combustion engine or any other type of vehicle power plant in a motor vehicle, and to a control unit for controlling an automatic start-up process of an internal combustion engine or any other type of vehicle power plant in a motor vehicle.

In order to reduce fuel consumption and pollutant emissions, the current trend is to develop methods and systems (and to some extent they have also been already installed) that automatically switch-off the electric motor, the hybrid motor or the internal combustion engine, (i.e., the power plant of a motor vehicle), under certain conditions and/or in the presence of shut-off conditions, which are defined, but under some circumstances can be freely applied during development by updating the data or program of the control unit, and that automatically re-start in the presence of start-up conditions, which are defined, but under some circumstances can be freely applied during development by updating the data or program of the control unit. Such methods and systems are suited, above all, for urban traffic, in order to reduce the consumption of fuel and simultaneously also to reduce the emissions, (for example to reduce $CO_2$ emissions), because in urban traffic the vehicle often comes to a standstill at traffic lights or owing to the traffic and because it is not necessary to run the internal combustion engine.

One possibility for designing such methods and systems of the aforementioned type is the automatic shut-off and start-up control device, which is disclosed in DE 101 61 343 A1 and intended for an internal combustion engine. In this case, the control device implements corresponding measures for shutting off the internal combustion engine, when all of the shut-off conditions are met. If the predetermined start-up conditions are satisfied, the control device implements the corresponding measures for automatically starting the internal combustion engine.

In principle, the shut-off conditions or start-up conditions, which are defined, but under some circumstances can be freely applied during development by updating the data or program of the control unit and which are intended for automatically shutting-off or starting the drive unit, can be divided into the shut-off request conditions and into the shut-off inhibiting conditions, as well as the start-up request conditions and start-up inhibiting conditions. In this context the shut-off request conditions are those shut-off conditions that have to be satisfied in order to be able to initiate—initiated by the software internal operating strategy of the control unit— an automatic shut-off process. In contrast, the shut-off inhibiting conditions are those shut-off conditions that must not be satisfied in order to be able to initiate—initiated by the software internal operating strategy of the control unit—an automatic shut-off process.

A shut-off inhibiting condition would be fulfilled, for example, when the charge state of the battery is below a predetermined limit value. Analogous to the shut-off conditions, the start-up conditions can also be divided into start-up request conditions and start-up inhibiting conditions.

Thus, DE 100 30 290 A1 also discloses a method and a system for automatically shutting-off and starting-up a vehicle power plant. In this case an automatic shut-off process is blocked, when all of the "driver-side" conditions are fulfilled, but the charge state of the battery of the vehicle is below a predetermined lockout threshold. This condition constitutes a shut-off inhibiting condition that cannot be influenced by the driver. The drive unit, which is constructed as an internal combustion engine, is automatically re-started again, for example, when during the immobilization period of the automatically shut-off internal combustion engine, the charge state of the battery drops below the predetermined lockout threshold, or when defined measures for automatically starting the internal combustion engine were initiated by the driver.

If, despite the presence of all of the shut-off request conditions and/or start-up request conditions, a drive unit and/or a vehicle power plant, which is based on the physical conversion of energy by combustion processes or based on purely electrical energy conversion (or based on a mixed form of both energy conversion methods (hybrid system)), is not automatically shut-off or started, then the result may be a complaint lodged by the customer or a negative impact on the acceptance of such systems, above all, when the customer cannot understand why the vehicle power plant was not automatically shut-off or started. If thereupon he were to go to an automotive service center, it is usually the case that the personnel at such service centers are also incapable of reconstructing the reason for the functional failure of the automatic shut-off and/or start-up process.

Working on this basis, the object of the invention is to make customer complaints more comprehensible at least for the personnel of the automotive service centers.

This object is achieved by a control unit for controlling an automatic shut-off process of a vehicle power plant in a motor vehicle, wherein the control unit emits a shut-off signal for initiating corresponding shut-off measures for automatically shutting-off the vehicle power plant, when predetermined shut-off request conditions are fulfilled, and no predetermined shut-off inhibiting condition is fulfilled. The control unit sends to a memory unit a memory signal for storing at least one memory entry, allocated to a shut-off inhibiting condition, when predetermined conditions are fulfilled. Further, a control unit is provided for controlling an automatic start-up process of a vehicle power plant in a motor vehicle, wherein the control unit emits a start-up signal for initiating corresponding start-up measures for automatically starting the vehicle power plant, when predetermined start-up request conditions are fulfilled, and no predetermined start-up inhibiting condition is fulfilled. The control unit sends to a memory unit a memory signal for storing at least one memory entry, allocated to the start-up inhibiting condition, when predetermined conditions are fulfilled. Advantageous further developments are disclosed herein.

The methods and control units for automatically shutting-off or starting a drive unit and/or a vehicle power plant can be used in a number of different vehicle functions. Thus, for example, within the scope of a so-called "automatic start/stop function" the vehicle power plant is shut off and also re-started again as a function of the predetermined conditions and in certain traffic situations, for example, at traffic lights or in so-called stop and go traffic. Similarly in the case of vehicles, which are equipped with a hybrid drive unit, consisting of an internal combustion engine (that is, an internal combustion engine with combustion that runs according to the thermodynamic processes of an Otto engine, diesel engine or similar design) and an electric motor, this internal combustion engine is partially shut-off and re-started, in order to save fuel and to reduce emissions.

In one aspect of the invention, a memory unit is provided, in which information is stored and which gives information as to why the internal combustion engine was not automatically shut-off or started, even though all of the defined shut-off request conditions and/or start-up request conditions are satisfied. With respect to the control device of an automatic shut-off process of a vehicle power plant, according to the above definition in a motor vehicle, in particular an internal combustion engine, the control unit of the invention is characterized in that the control unit sends to a memory unit a memory signal for storing at least one memory entry, allocated to a shut-off inhibiting condition, when predetermined conditions are fulfilled.

The memory unit can be a part of a memory unit that is already present in any event and that can be read out with commensurate read out devices in automotive service centers and during production of vehicle power plants.

In the case of different conditions, the control device can emit a variety of different memory signals, as a result of which a number of different memory entries can be made in turn.

The control device can send to the memory unit a memory signal, configured as an active signal, when, in addition to all of the shut-off request conditions, at least one shut-off inhibiting condition is also fulfilled, and, therefore, the vehicle power plant, in particular the internal combustion engine, is not automatically shut-off. As an alternative to the active signal, characteristic boundary times of the occurrence and decay of the active signal (for example, the signal edges) of the information to be stored can also be sent. In this context, the control unit sends, for example, an active signal, which is allocated precisely to this shut-off inhibiting condition and which can be differentiated from the active signals of other shut-off inhibiting conditions, for the duration, in which this shut-off inhibiting condition is fulfilled. As already stated above, this memory signal is emitted only if, in principle, a shut-off process could be initiated, since all of the shut-off request conditions are fulfilled. However, this is not possible, because at the same time a shut-off inhibiting condition is fulfilled. The active signal is withdrawn again, when either all of the shut-off request conditions are no longer present or when the corresponding shut-off inhibiting condition is no longer present. The decision about the method and the times, at which a condition can be set or retracted, is made by a logic unit that exists in the control unit. As an alternative, the active signal can also be withdrawn no earlier than the time at which the corresponding shut-off inhibiting condition no longer exists, irrespective of the shut-off request conditions.

As a function of the incoming memory signal, a corresponding entry is made in the memory unit. In order to be able to understand why an automatic shut-off process was not initiated, it is possible to store the shut-off inhibiting condition that is and/or was fulfilled. It is also possible to store advantageously when this shut-off inhibiting condition was fulfilled and when it switched its state again from "fulfilled" and/or "set" to "not fulfilled" and/or "withdrawn."

In one advantageous embodiment of the invention, the memory unit performs in response to an active signal at least one of the following memory entries:

a) a first memory entry, which reproduces the state of the shut-off inhibiting condition, thus, a so-called status entry, and/or b) a first kilometer (odometer) reading of the motor vehicle that is current at the time that the active signal is emitted, thus, a so-called start kilometer entry, and/or c) a second kilometer (odometer) reading of the motor vehicle that is current at the time that the active signal is terminated, thus, a so-called final kilometer entry.

As an alternative to the kilometer (odometer) entries in b) and c), it is also possible to store the respective times of the entries (relative to the current time or absolute since the defined count start of the times).

The so-called status entry gives information about whether the corresponding shut-off inhibiting condition at this time is currently fulfilled or not. The so-called start kilometer entry and/or the first kilometer reading (and/or the start time) show(s) at which kilometer reading this shut-off inhibiting condition was last fulfilled, and the final kilometer entry and/or second kilometer reading (and/or the final time) show(s) at which kilometer reading this shut-off inhibiting conditions last switched its status from "fulfilled" and/or "set" to "not fulfilled" and/or "withdrawn." The status entry, the start kilometer entry and the final kilometer entry are always overwritten again as soon as a new entry is made. Overwriting the start kilometer entry and the final kilometer entry can save memory locations.

In addition to the afore-mentioned memory entries, it is possible to make yet another memory entry, a so-called count memory entry, whose value is equivalent to the number as to how often this shut-off inhibiting condition has occurred since the total runtime of the vehicle or since the last reset of this value. This value can be used to detect whether a specific shut-off inhibiting condition often occurs unintentionally. This count memory entry can be made in that with each new arrival of the active signal the memory unit increases the value of the counter memory entry by 1.

In order not to make incorrect memory entries, it is possible for the memory unit in an advantageous embodiment to evaluate additionally yet another vehicle power plant signal, from which one can deduce whether the vehicle power plant was not, in fact, shut-off. Only if the vehicle power plant was not, in fact, shut-off and there is a corresponding memory signal, is a memory entry, assigned to this shut-off inhibiting condition, initiated.

The memory unit can be configured in such a manner that at least one of the afore-mentioned memory entries is made only for one shut-off inhibiting condition, for a predetermined number of shut-off inhibiting conditions, or for all of the shut-off inhibiting conditions. The number of shut-off inhibiting conditions, for which a memory entry is supposed to be initiated, can be based on the size of the memory unit. In order not to take up too many unnecessary memory locations, the memory entries may be made only for such shut-off inhibiting conditions that are difficult for the driver to understand, when owing to these conditions the internal combustion engine is not automatically shut-off. It is also possible to combine several shut-off inhibiting conditions in such a manner that the identical memory signals are sent for these shut-off inhibiting conditions, when at least one of these shut-off inhibiting conditions is fulfilled. Thus, the memory entry that is performed in this way does not distinguish between exactly which one of these shut-off inhibiting conditions was and/or is fulfilled. This state is interesting, above all, for such shut-off inhibiting conditions that are to be comprehensible to the driver. It offers the advantage that the corresponding memory unit does not have to be selected so as to be excessively large.

In principle, however, the memory area can also be configured in such a manner that all of the above defined conditions can be stored in the control unit and/or in an additional component of the control unit for the entire service life of the vehicle or for fractions of the useful period of the vehicle.

The following exemplary shut-off inhibiting conditions trigger advantageously a memory signal, when the shut-off inhibiting conditions are satisfied and/or they switch their state from "not fulfilled" to "fulfilled" or from "fulfilled" to "not fulfilled":

a) shut-off inhibiting condition based on the state of an air conditioning system, b) shut-off inhibiting condition based on the state of a power management system, c) shut-off inhibiting condition based on the load on an activated charcoal filter, d) shut-off inhibiting condition based on the brake pressure of a brake system or the vacuum brake system, e) shut-off inhibiting condition based on the temperature of the vehicle power plant, f) shut-off inhibiting condition based on the temperature of a catalyst or an additional component of the power plant system, g) shut-off inhibiting condition based on the motor-specific states of the vehicle power plant, h) shut-off inhibiting condition based on the fill level of a fuel tank or on the fill levels of other components of the power plant system, i) shut-off inhibiting condition based on the current outside air temperature or other current environmental conditions, j) shut-off inhibiting condition based on the currently active adaptive processes and/or active vehicle functions or other active software functionalities in the interconnected network group of the vehicle, k) shut-off inhibiting condition based on predetermined states of the vehicle, l) shut-off inhibiting condition based on the system deactivation condition.

The shut-off inhibiting condition, described under a), occurs, for example, when the current state of the air conditioning system does not allow an automatic shut-off process. This could be the case, if in the event of a switched-off internal combustion engine, adequate heating/cooling of the interior of the vehicle were no longer guaranteed. The shut-off inhibiting condition, described under b), occurs, for example, if the power management system finds itself, for example due to a discharged battery, in a state, in which no automatic shut-off process can be initiated. The shut-off inhibiting condition, described under c), occurs, for example, if the load state of an activated charcoal filter exceeds a defined limit value. The shut-off inhibiting condition, described under d), occurs, for example, if the brake pressure of a brake system exceeds or drops below a defined brake pressure. The shut-off inhibiting condition, described under e), occurs, for example, if the temperature of the internal combustion engine or an additional vehicle power plant exceeds a predetermined temperature range and/or limit value. The shut-off inhibiting condition, described under f), occurs, for example, if the temperature of a catalyst exceeds a predetermined temperature range and/or limit value. The shut-off inhibiting condition, described under g), occurs, for example, if the internal combustion engine is in a state, in which an automatic shut-off process is not possible and/or is not logical. The shut-off inhibiting condition, described under h), occurs, for example, if the fill level of a tank system drops below a predetermined limit value. The shut-off inhibiting condition, described under i), occurs, for example, if the outside air temperature exceeds or drops below a predetermined temperature range. The shut-off inhibiting conditions, described under j) and k), occur, for example, if a diesel particulate filter is in a regenerating state, or if, for example, in the case of an unintentional shut-off process, a speed control system is active, and, therefore, the shut-off system does not allow a shut-off process.

The shut-off inhibiting condition, described under l), occurs, for example, if the system, triggering the automatic shut-off process, was deactivated because of the predetermined conditions, the so-called deactivation conditions. These deactivation conditions can be combined into one shut-off inhibiting condition, or each deactivation condition can generate a separate memory signal, which is allocated to the corresponding deactivation condition, and can lead to a memory entry that is a function of the respective deactivation condition.

In a manner analogous to the control unit for controlling an automatic shut-off process, a control unit for controlling an automatic start-up process of a vehicle power plant, in particular, an internal combustion engine, can be designed, according to an embodiment of the invention, in such a manner that the control unit sends to a memory unit a memory signal for storing at least one memory entry, which is allocated to a start-up inhibiting condition, when the predetermined conditions are fulfilled. Correspondingly, the memory signals for the start-up inhibiting conditions can also be configured, according to the memory signals for the shut-off inhibiting conditions, as active signals. Then the memory unit can store, as a function of these signals, the status of the corresponding start-up inhibiting condition; the first kilometer (odometer) reading, which was current at the time of the last occurrence of this start-up inhibiting condition, and the second kilometer (odometer) reading, which was current at the time of the last termination of the occurrence of this start-up inhibiting condition, as the memory entry. As already stated above, instead of the respective storage of a kilometer (odometer) reading, a relative or absolute time designation can also be stored. Moreover, the other embodiments of the inventive control unit for controlling an automatic shut-off process can also be applied to the inventive control unit for controlling the automatic start-up process. In this respect, the two control units and the two memory units can be designed as one unit.

Thus, these control units of the invention offer the advantage that the memory unit, which is filled in this way, can be read-out by way of a read-out device in automotive service centers and in the production of vehicle power plants. Thus, it is possible to reconstruct why a desired shut-off process and/or start-up process was not carried out.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
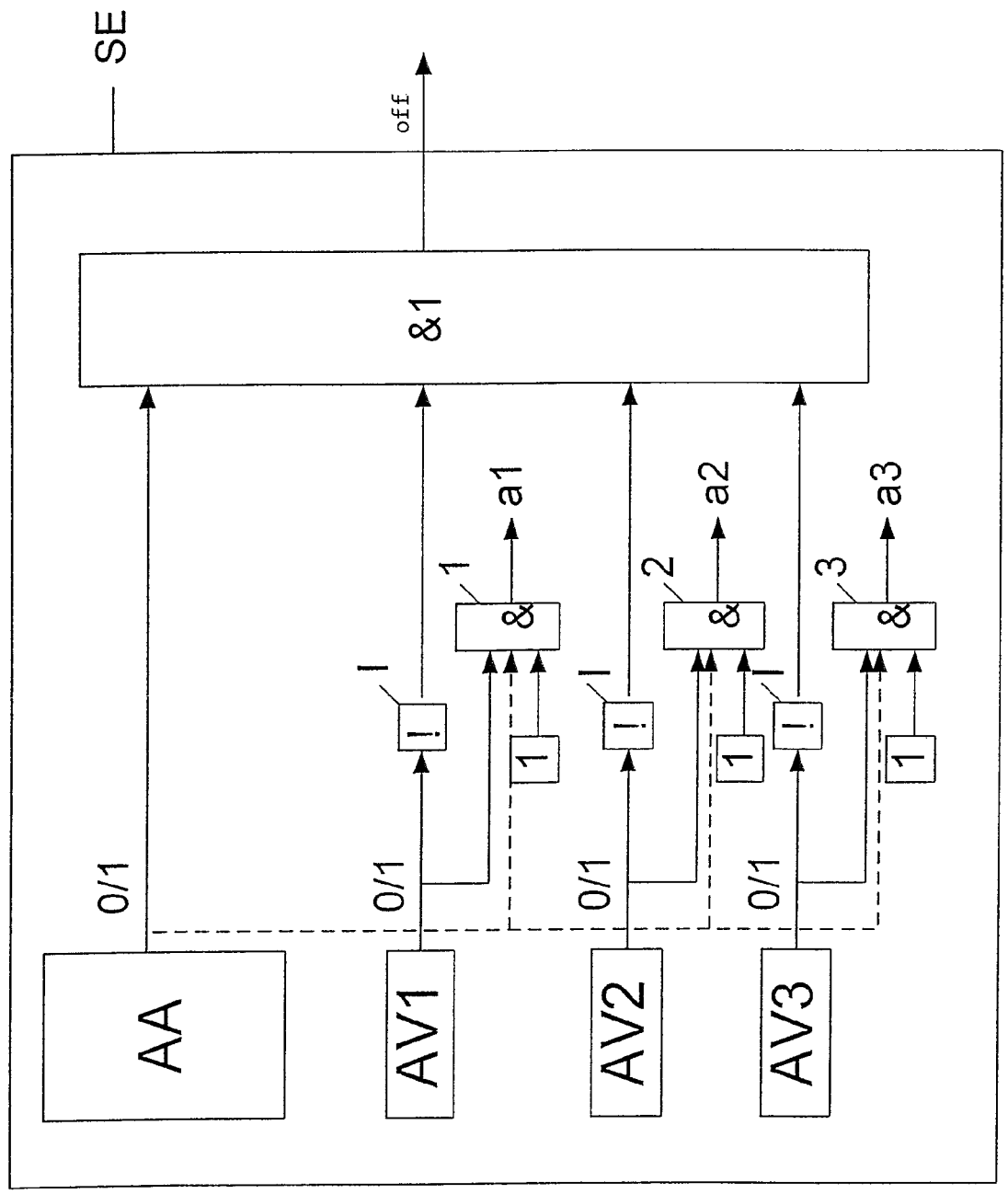
FIG. 1 depicts a simplified inventive control unit for controlling an automatic shut-off process of a vehicle power plant.

FIG. 1 shows a control unit SE for controlling an automatic shut-off process of a vehicle power plant, which is not depicted here and which is designed as an internal combustion engine, in a motor vehicle. In the control unit SE, the predetermined shut-off request conditions AA and the predetermined shut-off inhibiting conditions AV1, AV2, and AV3 are evaluated for their current state. If all of the shut-off request conditions AA are fulfilled, the shut-off request conditions AA emit a one 1. If just one shut-off request condition is not fulfilled, then a zero 0 is emitted. Correspondingly, each shut-off inhibiting condition AV1, AV2 and AV3 emits a zero 0, if it is not fulfilled, thus, not opposed to an automatic shut-off process, and a one 1 if the shut-off inhibiting condition AV1, AV2 or AV3 is fulfilled.

In a respective inverting unit I, the value 0 and/or 1, which is emitted by the shut-off inhibiting conditions AV1, AV2 and AV3, is inverted, so that the &1 unit emits a shut-off signal (off), when all of the input signals have the value 1, and it is possible to shut off the internal combustion engine. Thus, the control unit SE emits a shut-off signal for initiating the corresponding shut-off measures for automatically shutting off the vehicle power plant, when the predetermined shut-off request conditions AA are fulfilled, thus, if they emit a one, and if none of the predetermined shut-off inhibiting conditions AV1, AV2 and AV3 is fulfilled, thus a zero is emitted.

If at least one of the shut-off inhibiting conditions AV1, AV2 or AV3 is fulfilled, that is, the corresponding shut-off inhibiting condition emits a one 1, then this is detected in one of the three & units 1, 2 and/or 3. If all of the shut-off request conditions AA are fulfilled simultaneously, then the corresponding & unit 1, 2, or 3 emits, for the duration of the fulfilled shut-off inhibiting condition AV1, AV2 and/or AV3, a memory signal, which is configured as an active signal a1, a2, and/or a3, to a memory unit, which is not depicted here. Not until the corresponding shut-off inhibiting condition AV1, AV2 and/or AV3 is no longer fulfilled, is the active signal a1, a2 and/or a3 withdrawn (independently of the state of the shut-off request conditions).

Figures 2, 3:
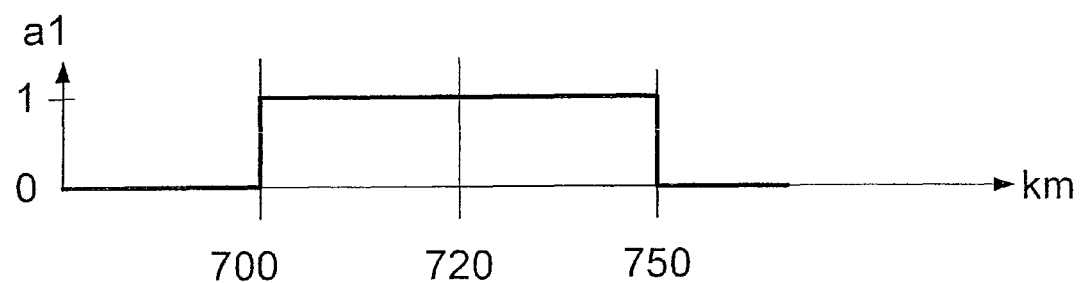
FIG. 2 shows the progress of an exemplary signal of an active signal of a first shut-off inhibiting condition, the active signal being emitted by the control unit.
FIG. 3 depicts one example of the configuration of a memory unit.

FIG. 2 shows the progress of an exemplary signal of the active signal a1, which belongs to the first shut-off condition AV1, under the condition that all shut-off request conditions AA are fulfilled. In addition, however, the first shut-off inhibiting condition AV1 between a first kilometer reading of 700 km and a second kilometer reading of 750 km is fulfilled. At the point-in-time, at which the vehicle has already driven 700 km, the circumstance occurs that, in addition to all shut-off request conditions AA, the shut-off inhibiting condition AV1 is also fulfilled. After this point in time, the control unit SE emits an active signal a1 to the memory unit. The start is detectable by the rising edge of the active signal a1. At the point-in-time, at which the vehicle has already traveled 750 km, this shut-off inhibiting condition ceases to exist. At this point-in-time, the control unit withdraws again the active signal a1. The end is detectable by the negative edge of the active signal.

As an alternative to the detection of the edges of an active signal in relation to the kilometer reading or to a relative or absolute time designation, the relative kilometer reading can also be stored. This means, for example, the detection of the "positive" edge occurred 700 kilometers before the current kilometer (odometer) reading, which was counted in the vehicle (and which shows the total trip kilometrage of the vehicle by way of the instrument cluster). Moreover, the detection of the "negative" edge occurs temporally later than the detection of the positive edge, based on the example at 650 kilometers before the current kilometer reading counted in the vehicle.

At this stage FIG. 3 shows a simplified configuration of a memory unit Sp, where the entries in the memory unit Sp were and/or are caused by corresponding memory signals. FIG. 3 shows a snapshot at a time, at which a vehicle has already traveled 720 km. The memory unit receives the signal a1, which is allocated to the first shut-off inhibiting condition AV1 and is depicted in FIG. 2. In addition to this signal a1, the memory unit also receives the signals a2 and a3, which are allocated to a second and third shut-off inhibiting condition. For the sake of simplification, it is assumed that at this time, except for the first shut-off inhibiting condition AV1, no additional shut-off inhibiting condition AV2 and/or AV3 is fulfilled, and thus, the control unit SE does not emit a corresponding active signal a2 and/or a3 to the memory unit.

The memory unit Sp is designed in such a manner that a line for memory entries is available to each shut-off inhibiting condition. In each line four memory entries can be made. In this context the first column S reproduces the current state of the corresponding shut-off inhibiting condition, and the value in the second column S_A reproduces the kilometer reading, at which the corresponding shut-off inhibiting condition last switched its state from "not active" to "active."

The value in the third column S_E reproduces the kilometer reading, at which the corresponding shut-off inhibiting condition last switched its state from "active" to "not active." The fourth column Z shows the number of active states of the corresponding shut-off inhibiting condition since the last reset of this counter.

At this point the illustrated memory unit shows clearly that the first shut-off inhibiting condition AV1 is currently active, and in particular, since the point-in-time, at which the vehicle had traveled 700 km (rising edge of the active signal a1). The last time the fulfilled shut-off inhibiting condition AV1 left its fulfilled state was at a kilometer reading of 650 km (negative edge of the active signal a1). In total, this shut-off inhibiting condition AV1 has already been fulfilled 15 times. In contrast, the second shut-off inhibiting condition AV2 was fulfilled only once, is currently not fulfilled, and was fulfilled the last time between a kilometer reading of 20 km and 25 km. The third shut-off inhibiting condition AV3 has never been fulfilled to date.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for controlling an automatic shut-off process of a vehicle power plant in a motor vehicle, comprising:

a control unit operatively configured to emit a shut-off signal for initiating corresponding shut-off measures for automatically shutting-off the vehicle power plant, when predetermined shut-off request conditions are fulfilled, and no predetermined shut-off inhibiting condition is fulfilled; and a memory unit;

wherein the control unit is operatively configured to emit a memory signal for storing at least one memory entry allocated to a shut-off inhibiting condition in the memory unit when predetermined conditions are fulfilled.

2. The apparatus according to claim 1, wherein for each shut-off inhibiting condition, a memory signal allocated to the respective shut-off inhibiting condition is triggered and, in response to each said memory signal, a respective memory entry allocated to the shut-off inhibiting condition is made in the memory unit.

3. The apparatus according to claim 1, wherein the control unit emits the memory signal to the memory unit as an active signal when, in addition to all predetermined shut-off request conditions being fulfilled, at least one predetermined shut-off inhibiting condition is fulfilled.

4. The apparatus according to claim 3, wherein, in response to the active signal, recorded in the memory unit is at least one of the following memory entries:
   a) a first memory entry, reproducing a state of the shut-off inhibiting condition;
   b) a first odometer reading of the motor vehicle that is current at a time that the active signal is emitted; and
   c) a second odometer reading of the motor vehicle that is current at the time that the active signal is terminated.

5. The apparatus according to claim 4, wherein the memory entry made in response to the active signal is rewritable.

6. The apparatus according to claim 4, further comprising a counter unit, wherein in response to the active signal sent to the memory unit, the counter unit assigned to a corresponding shut-off inhibiting condition is increased.

7. The apparatus according to claim 3, wherein the memory entry made in response to the active signal is rewritable.

8. The apparatus according to claim 7, further comprising a counter unit, wherein in response to the active signal sent to the memory unit, the counter unit assigned to a corresponding shut-off inhibiting condition is increased.

9. The apparatus according to claim 3, further comprising a counter unit, wherein in response to the active signal sent to the memory unit, the counter unit assigned to a corresponding shut-off inhibiting condition is increased.

10. The apparatus according to claim 3, wherein a memory entry is made in the memory unit in response to the active signal only if the vehicle power plant is not automatically shut-off.

11. The apparatus according to claim 1, wherein at least one of the following shut-off inhibiting conditions triggers a memory signal when satisfied:
   a) a first shut-off inhibiting condition based on a state of an air conditioning system,
   b) a second shut-off inhibiting condition based on a state of a power management system,
   c) a third shut-off inhibiting condition based on a load on an activated charcoal filter,
   d) a fourth shut-off inhibiting condition based on a brake pressure of a brake system or a vacuum brake system,
   e) a fifth shut-off inhibiting condition based on a temperature of the vehicle power plant,
   f) a sixth shut-off inhibiting condition based on a temperature of a catalyst or an additional component of the vehicle power plant,
   g) a seventh shut-off inhibiting condition based on one or more motor-specific states of the vehicle power plant,
   h) an eighth shut-off inhibiting condition based on a fill level of a fuel tank or on fill levels of other components of the vehicle power plant,
   i) a ninth shut-off inhibiting condition based on a current outside air temperature or other current environmental conditions,
   j) a tenth shut-off inhibiting condition based on one or more currently active adaptive processes and/or active vehicle functions or other active software functionalities in an interconnected network group of the vehicle,
   k) an eleventh shut-off inhibiting condition based on one or more predetermined vehicle states, and
   l) a twelfth shut-off inhibiting condition based on a system deactivation condition.

12. A method for controlling an automatic shut-off process of a vehicle power plant in a motor vehicle, the method comprising the acts of:
   determining when predetermined shut-off request conditions are fulfilled;
   determining whether one or more of predetermined shut-off inhibiting conditions are fulfilled; and
   issuing, by a control unit, a signal for storing at least one memory entry in a memory unit, the at least one memory entry being allocated to a respective predetermined shut-off inhibiting condition that was fulfilled, when the predetermined shut-off request conditions are fulfilled.

13. The method according to claim 12, wherein the memory signal issued by the control unit is an active signal.

14. The method according to claim 13, wherein, in response to the active signal, at least one of the following memory entries is stored in the memory unit:
   a first memory entry reproducing a state of the shut-off inhibiting condition;
   a first odometer reading of the motor vehicle current at a time that the active signal is emitted; and
   a second odometer reading of the motor vehicle current at a time that the active signal is terminated.

15. The method according to claim 14, further comprising the act of increasing a counter signal assigned to the corresponding shut-off inhibiting condition in response to the active signal.

16. The method according to claim 12, wherein the act of issuing the signal is carried out when at least one of the following shut-off inhibiting conditions is fulfilled:
   a) a first shut-off inhibiting condition based on a state of an air conditioning system,
   b) a second shut-off inhibiting condition based on a state of a power management system,
   c) a third shut-off inhibiting condition based on a load on an activated charcoal filter,
   d) a fourth shut-off inhibiting condition based on a brake pressure of a brake system or a vacuum brake system,
   e) a fifth shut-off inhibiting condition based on a temperature of the vehicle power plant,
   f) a sixth shut-off inhibiting condition based on a temperature of a catalyst or an additional component of the vehicle power plant,
   g) a seventh shut-off inhibiting condition based on one or more motor-specific states of the vehicle power plant,
   h) an eighth shut-off inhibiting condition based on a fill level of a fuel tank or on fill levels of other components of the vehicle power plant,
   i) a ninth shut-off inhibiting condition based on a current outside air temperature or other current environmental conditions,
   j) a tenth shut-off inhibiting condition based on one or more currently active adaptive processes and/or active vehicle functions or other active software functionalities in an interconnected network group of the vehicle,
   k) an eleventh shut-off inhibiting condition based on one or more predetermined vehicle states, and
   l) a twelfth shut-off inhibiting condition based on a system deactivation condition.

17. An apparatus for controlling an automatic start-up process of a vehicle power plant in a motor vehicle, comprising:
- a control unit operatively configured to emit a start-up signal for initiating corresponding start-up measures for automatically starting the vehicle power plant, when predetermined start-up request conditions are fulfilled, and no predetermined start-up inhibiting condition is fulfilled; and
- a memory unit;
- wherein the control unit is operatively configured to emit a memory signal for storing at least one memory entry allocated to a start-up inhibiting condition in the memory unit when predetermined conditions are fulfilled.

18. A method for controlling an automatic start-up process of a vehicle power plant in a motor vehicle, the method comprising the acts of:
- determining when predetermined start-up request conditions are fulfilled;
- determining whether one or more of predetermined start-up inhibiting conditions are fulfilled; and
- issuing, by a control unit, a signal for storing at least one memory entry in a memory unit, the at least one memory entry being allocated to a respective predetermined start-up inhibiting condition that was fulfilled, when the predetermined start-up request conditions are fulfilled.

* * * * *